Figure 12:
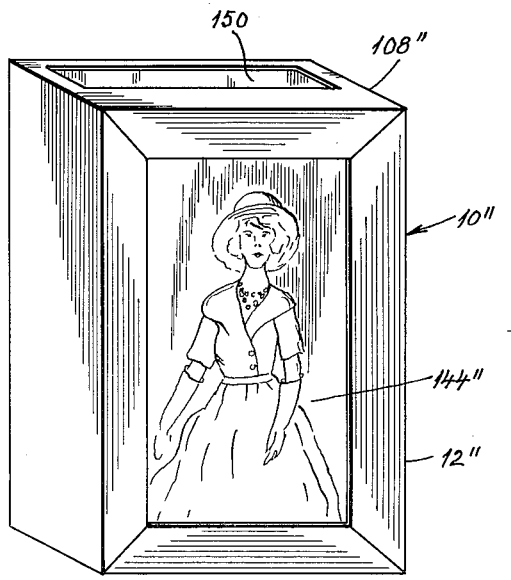

Sept. 14, 1965  J. H. SNYDER  3,205,600
DAY AND NIGHT TRANSPARENCY, TRANSLUCENCY
AND/OR PRINT AND DISPLAY FRAME THEREFOR
Filed Aug. 5, 1963 5 Sheets-Sheet 1
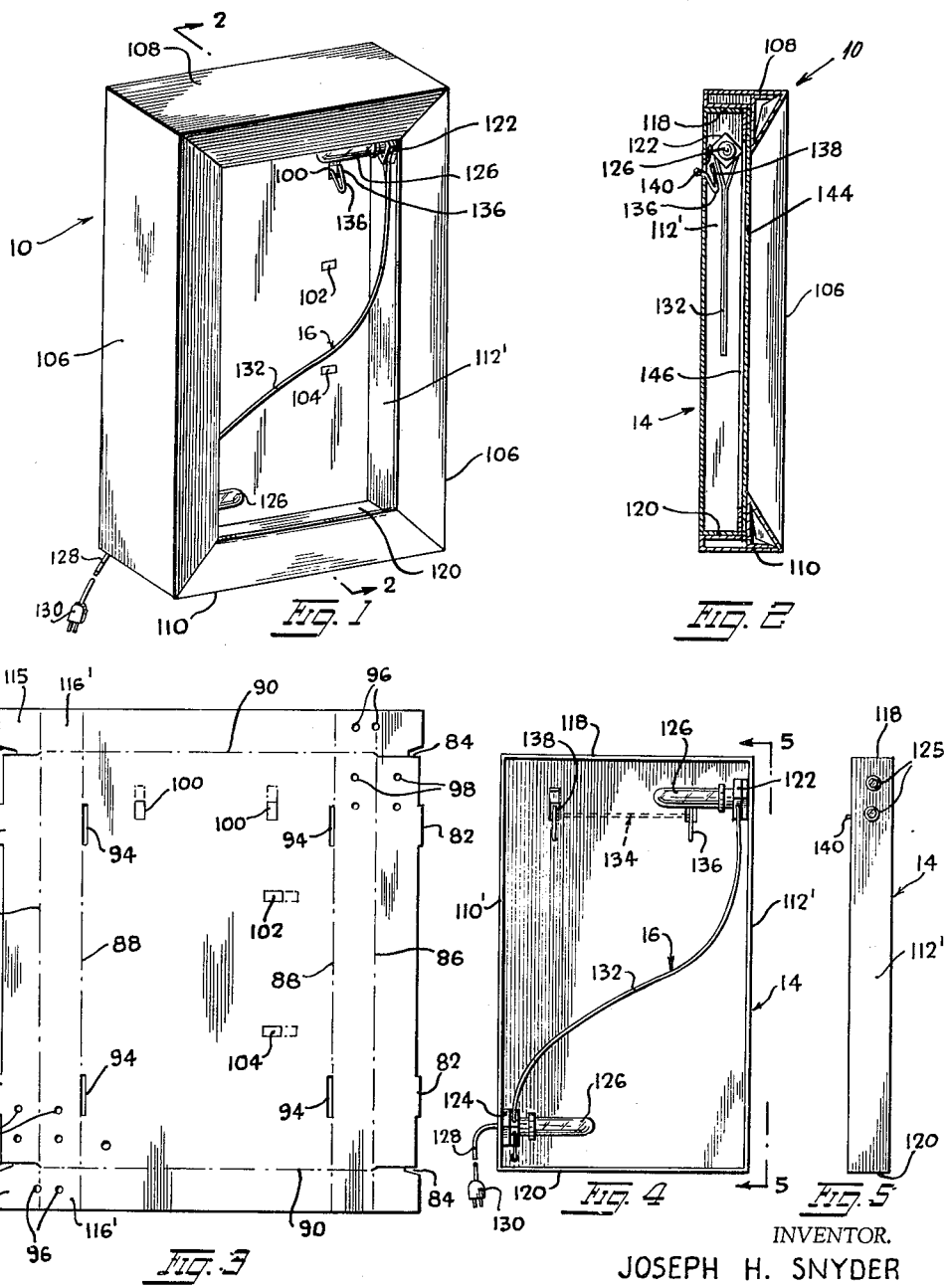
INVENTOR.
JOSEPH H. SNYDER
BY
*Placek & Saulsbury*
ATTORNEYS

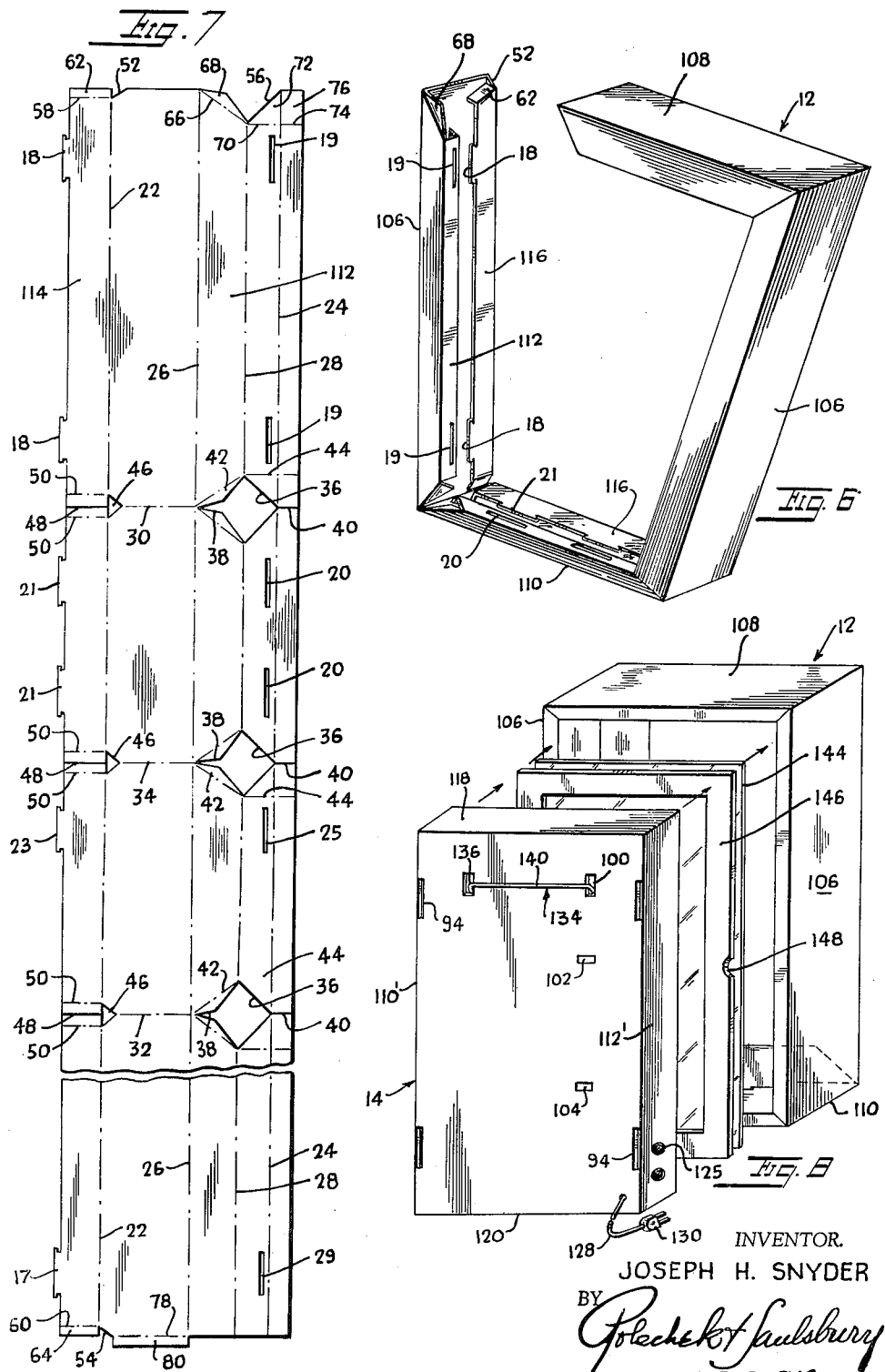

Sept. 14, 1965
J. H. SNYDER
3,205,600
DAY AND NIGHT TRANSPARENCY, TRANSLUCENCY
AND/OR PRINT AND DISPLAY FRAME THEREFOR
Filed Aug. 5, 1963
5 Sheets-Sheet 3
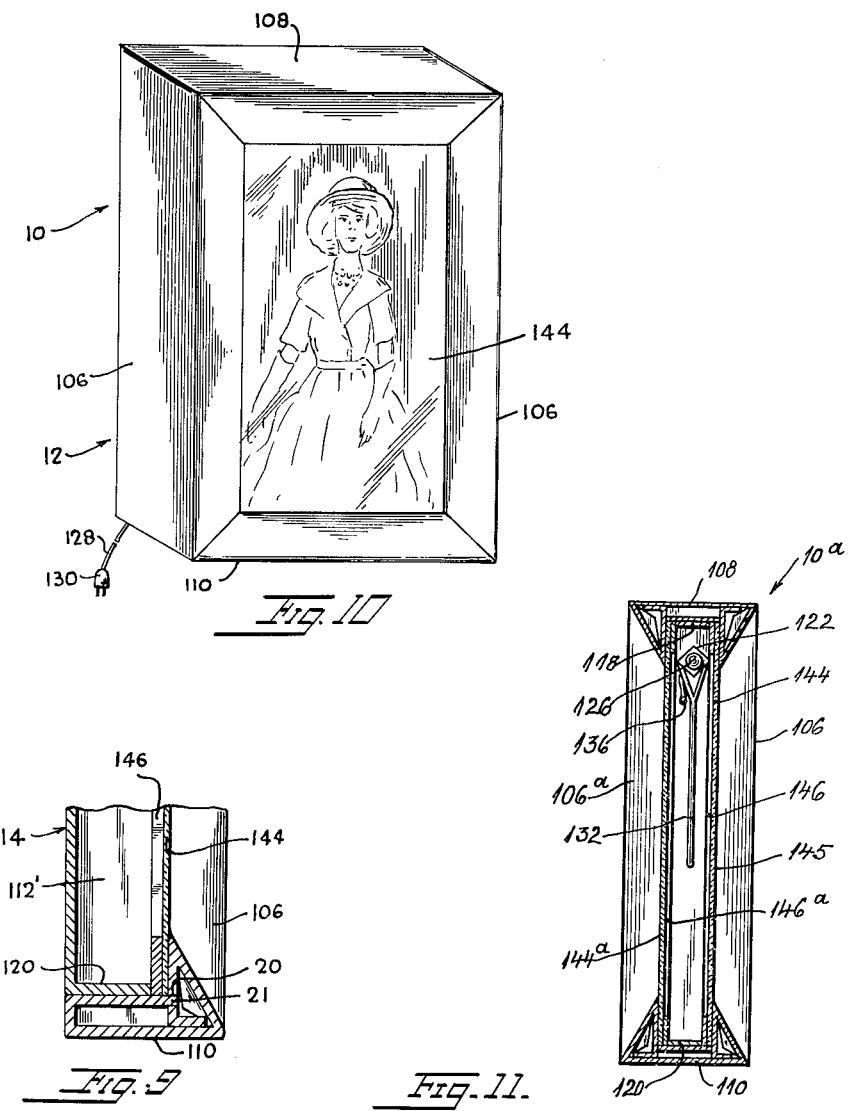
INVENTOR.
JOSEPH H. SNYDER
BY
ATTORNEYS Sept. 14, 1965                J. H. SNYDER                3,205,600
              DAY AND NIGHT TRANSPARENCY, TRANSLUCENCY
              AND/OR PRINT AND DISPLAY FRAME THEREFOR
Filed Aug. 5, 1963                                5 Sheets-Sheet 4

INVENTOR.
Joseph H. Snyder
BY
ATTORNEY

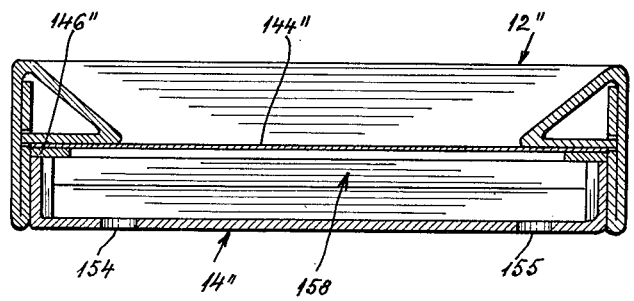
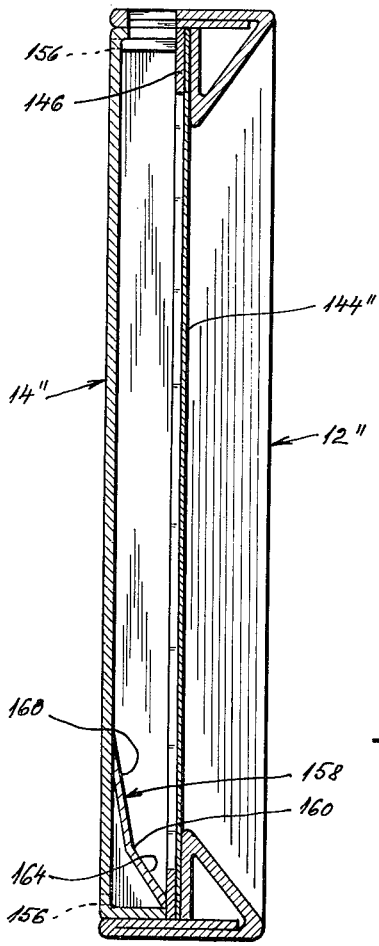

United States Patent Office

3,205,600
Patented Sept. 14, 1965

3,205,600
DAY AND NIGHT TRANSPARENCY, TRANSLUCENCY AND/OR PRINT AND DISPLAY FRAME THEREFOR
Joseph H. Snyder, 43 W. 61st St., New York 23, N.Y.
Filed Aug. 5, 1963, Ser. No. 299,708
1 Claim. (Cl. 40—152.2)

This invention relates generally to photographic display devices and more particularly to a day and night translucency, transparency and/or picture prints and display frames therefor.

A principal object of the invention is to provide a day and night picture translucency, transparency and/or picture print frames therefor, that has the property of a print when viewed by reflected light and of a translucency by transmitted light and is effective for use in high light surrounding locations which would normally tend to "block up" a standard transparency.

Another object is to provide a picture translucency, transparency and/or print that has its own uniform diffusion material of the proper density built into the base material and needs no background diffusion sheeting for installation.

Another object is to provide a picture translucency, transparency, and/or print that is protected with a coating of flame retarding substance, and that has a high degree of permanence.

A further object of the present invention is to provide a picture frame or holder construction formed from blanks of sheet material that are quickly and readily folded along the scored lines thereof to form an attractive picture frame construction.

An important object of the present invention is to provide a picture frame or holder construction-forming blanks composed of rectangular or strip body portions, the ends and sides of one which blanks are folded into channels forming an outer frame member, and the ends and sides of the other blanks are folded into flanges providing a picture-supporting box-like member receivable in the channels whereby the frame member is retained in its desired form.

A further object of the invention is to provide a three-dimensional folding picture frame construction that is formed blanks of foldable material, such as cardboard, and which include side and end portions that are substantially triangular in cross section and having inwardly and rearwardly inclined walls that tend to direct a person's vision to a picture held by the frame construction behind the side and end portions and that tend to create an impression of depth.

Specific objects of the invention are to provide a picture-displaying frame or holder construction that can be assembled easily from lightweight, low-cost sheet material, and that has at least one light source therein so that the picture may be viewed at night as well as during daylight hours.

It is also an object of the present invention to provide a folding picture frame of this character that is simple and practical in construction, strong and reliable in use, light in weight, inexpensive to manufacture and otherwise well adapted for the purposes for which the same is intended.

According to one embodiment of the invention, the picture frame or holder construction comprises broadly a flanged closure and light-diffusing plate constituting a box-like member to support a photograph or picture, a rectangular-shaped strip serving as a backing for a photograph and illuminating apparatus supported on the flanged closure plate. Encompassing the flanged closure plate and backing is an open framework structure of sheet material. A metal hanger is removably mounted on the backing plate for suspending the display device from a support.

For further comprehension of the invention, and of the objects and advantages thereof, reference will be had to the following description and accompanying drawings, and to the appended claims in which the various novel features of the invention are more particularly set forth.

Figure 13:
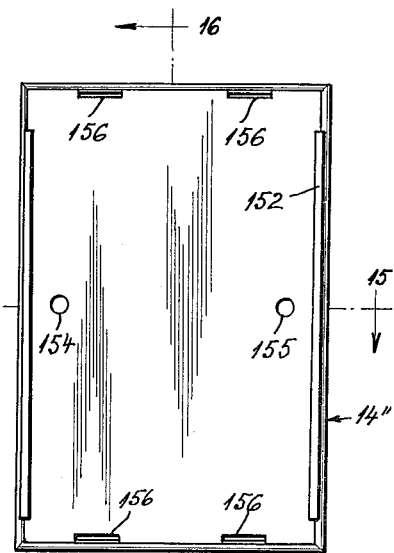
Figure 14:
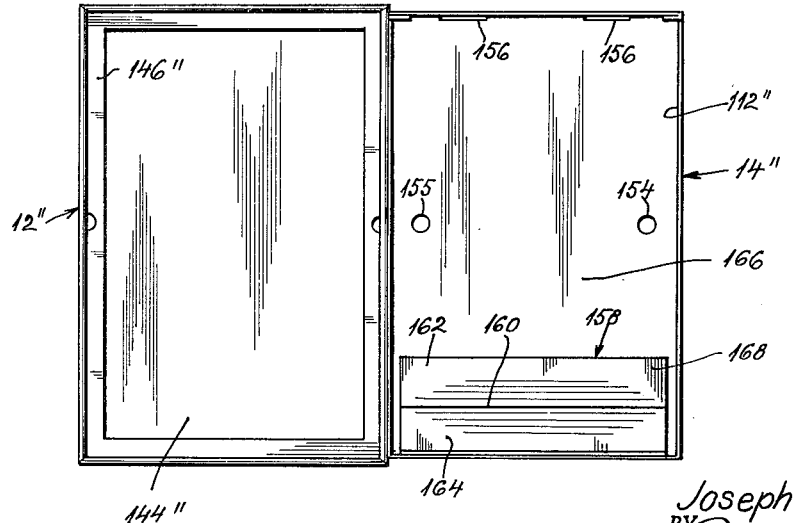

In the accompanying drawings forming a material part of this disclosure:
FIG. 1 is a front perspective view of a picture frame or holder construction embodying my invention.
FIG. 2 is a vertical sectional view taken on the plane of the line 2—2 of FIG. 1.
FIG. 3 is a plan view of a blank from which the flanged backing plate is formed.
FIG. 4 is a front elevational view of the flanged backing plate showing light sources supported on the flanges.
FIG. 5 is a side view thereof as seen from the line 5—5 of FIG. 4.
FIG. 6 is a perspective view of the outer frame in partly assembled condition.
FIG. 7 is a top plan view of a fragment of the blank from which the frame of FIG. 6 is formed.
FIG. 8 is an exploded perspective view of the picture frame or holder construction of FIG. 1.
FIG. 9 is an enlarged sectional view of the bottom of the parts shown in FIG. 2.
FIG. 10 is a view similar to FIG. 1 but showing a picture in display position.
FIG. 11 is a view similar to FIG. 2 of a modification of the invention.
FIG. 12 is a view similar to FIG. 10 of a modified form of the invention.
FIG. 13 is a rear view thereof.
FIG. 14 is a rear view with the backing plate in open condition.
FIG. 15 is a cross-sectional view taken on the line 15—15 of FIG. 13.
FIG. 16 is a vertical sectional view taken on the line 16—16 of FIG. 13.

Referring in detail to the various views of the drawings wherein similar parts are indicated by similar reference numerals, in FIG. 10 a picture frame or holder construction embodying my invention is shown and designated generally by the numeral 10. The frame or holder construction 10 comprises broadly an outer framework structure 12, an inner flanged backing plate 14 and picture illuminating apparatus supported on the flanges of the backing plate as indicated generally at 16.

The outer framework structure 12 is rectangular in configuration and is formed of sheet material, such as cardboard, the blank strip from which the structure is formed being shown in FIG. 7. A number of tabs are formed along one long edge of the blank strip in spaced relationship. The outermost tabs 18, 18, at one end, the top end as viewed in FIG. 7, are spaced remotely from each other. At the other end, a pair of closely spaced tabs 17 (only one being shown) is formed. A closely spaced pair of tabs 21, 21 are formed adjacent the inner tab 18, and a widely spaced pair of tabs 23 are formed (only one being shown) adjacent the innermost tab 17. A number of pairs of closed slots 19, 20, 25 and 29 are formed along the other long edge opposite the tabs 18, 21, 23, 17, respectively.

A score line 22 is formed in the blank strip lengthwise thereof and closely spaced inwardly of the tabs. Another score line 24 is formed in the blank strip lengthwise thereof and closely spaced outwardly of the closed slots 20. A third score line 26 is formed substantially centrally of the blank strip and lengthwise thereof, and a fourth score line 28 is formed lengthwise of the blank midway between the second and third score lines 26 and 24, respectively.

A transverse score line 30 is formed remote from one end of the blank and a similar score line 32 is formed remote from the other end of the blank, and a third similar transverse score line 34 is formed intermediate the lines 30 and 32. Along each transverse line, at one side of the blank, the side remote from the tabs 18, a diamond-shaped opening 36 is formed. Each opening 36 is formed with a notch 38 forming a continuation of its inner corner, the notch pointing to the score line.

A score line 40 extends from the outer corner of each opening 36 as viewed in FIG. 7 to the adjacent long edge and a score line 42 extends from the pointed end of the notch to each of the other corners of each opening 36. Another score line 44 extends from one of said other corners to the adjacent long edge.

Opposite each opening 36, closely spaced inwardly from the adjacent long edge of the blank, a smaller triangular-shaped opening 46 is formed, the apex of the opening pointing toward the score line and toward the opposed notch. A score line 48 extends from the adjacent long edge to the center of the base of each triangular opening 46, and score lines 50, 50 extend parallel to line 48 to the ends of the base. Shallow end notches 52, 54 are formed in the ends of the blank strip adjacent one long edge thereof, the edge mounting the tabs, and a deep notch 56 is formed at one end adjacent the other long edge. Score lines 58 and 60 from the notches 52, 54 to the adjacent long edge form flaps 62, 64, respectively. A score line 66 extends from the end line 26 to the point of the notch 56 forming a triangular-shaped flap 68. A score line 70 from the point of the notch 56 to the line 24 forms a triangular-shaped flap 72. A score line 74 forming a continuation of score line 70 forms a flap 76. A score line 78 at the other end of the blank strip extends from the notch 54 to line 26 and forms a flap 80.

Referring to FIGS. 4 and 8, the flanged closure plate 14 is rectangular in configuration and is formed of sheet material such as cardboard, the rectangular blank from which the member is formed being shown in FIG. 3. On its long edges, inwardly of the ends, the blank is formed with opposed tabs 82, and outwardly of the tabs but closely spaced inwardly from the ends opposed notches 84 are cut in the blank. A score line 86 is formed from end to end of the blank inwardly of each long edge and inwardly of each score line 86 there is another score line 88 from end to end of the blank, the spacing between the long edges and lines 86 being similar to the spacing between the lines 86 and 88. A transverse score line 90 extends across the blank at each end from notch to notch at the respective end. The lines 90 intersect the score lines 86 and 88. A closed slot 94 is formed opposite each tab 82 along each score line 88. Pairs of small holes 96 are formed in the blank at diagonally opposite corners outwardly of the transverse score lines 90 and notches 84, and pairs of similar holes 98 are formed closely spaced inwardly of the score lines 90 and notches 84. The material of the blank is instruck at one end thereof to form spaced slots 100, 100 and at points in line with one of said slots to form an intermediate slot 102 and a lower slot 104.

In forming the outer frame structure 12 shown in FIG. 6, the elongated blank strip shown in FIG. 7 is folded along the lines 22, 24, 26, 28. The tabs are inserted into their respective opposite slots and interlocked therewith, thereby forming tubular side walls 106, 106 and tubular end walls 108 and 110, with the flaps 112 defined by the lines 26 and 28 slanting inwardly, and the flaps 114 defined by the line 22 and adjacent long edge of the blank strip serving as inner straight wall portions 116. The blank strip is then bent along the transverse lines 30, 32, 34 whereby the walls are brought into intimate end contact, the openings 36, notches 38, openings 46, score lines 40, 42, 48, 50, 50 permitting this operation.

In assembling the flanged backing plate 14 shown in FIGS. 4 and 8, the blank shown in FIG. 3 is folded along the lines 86, 88 and the tabs 82 inserted into the slots 94 thereby forming the double-walled side flanges 110′, 112′. The blank is then folded along the transverse lines 90, 90 and the corner flaps 115, 116′ defined by the lines 86, 88, 90 are folded and tucked inside the ends of the double-walled side flanges, thereby forming the end flanges 118, 120.

The apparatus 16 for illuminating the display device is supported on the side flanges 110′, 112′ of the backing plate and includes an electrical socket 122 at one end of flange 112′ and an electrical socket 124 at the other end of flange 110′. The sockets are secured by screws 125 and have the necessary terminals for contacting the terminals of lamps 126 plugged therein. The socket 124 is electrically connected to a source of electric motive power by means of a cable 128 having a plug 130 for insertion into such source, such as a house supply. The sockets are electrically connected by a cable 132. A bail-shaped rod 134 is provided for suspending the display device from a support. The rod 134 is formed with hooks 136 on the free ends of the legs 138 thereof. The legs are inserted through the slots 100, 100 and the hooks 136 removably hooked over the edge walls of one end of the slots thereby positioning the bight portion 140 of the rod against the material of the plate body.

In assembling the display device 10, while the frame structure 12 is partly assembled as shown in FIG. 6, the flanged closure plate 14 with the illuminating apparatus 16 and the supporting rod 134 mounted thereon is positioned inside the frame structure with the end flange 120 resting on the inner straight wall portion 116 of the bottom wall 110 of the frame structure. The end wall 108 is then secured to the side wall 106 of the frame structure by infolding the flaps 62, 68, 72 and 76, the slots 52 and 56 permitting this operation. The flap 80 on the end of end wall 108 is then bent inwardly to interlock with the adjacent side wall 106 and flaps.

An important feature of the present invention is a novel photograph or picture 144 used in the frame construction. This photograph or picture 144 is formed from an emulsion produced by a modified dye transfer process and marketed under the trade name "Du Pont Cronar." This substance is stable and has great strength and is easily handled. It is characterized by color stability and levels of color saturation and brilliance can be achieved not usually possible in a three-layer film emulsion. When viewed in reflected light, the picture is a print and when viewed by artificial light the picture is a translucency. The combination of these two characteristics make the picture effective for use in high light surrounding locations which would normally tend to "block up" a standard transparency. This picture has its own uniform diffusion material of the proper density built into the base material of the picture so that no diffusion sheeting is required for installation. The picture is protected by a transparent coating or film 145 of flame retarding substance.

The photograph or picture 144 on a translucent sheet is placed flatwise against a rectangular-shaped flat strip 146 of cardboard which is pressed against the edges of the flanges 110′, 112′, 118, 120 of the plate 14 and serves as a backing plate for the photograph or picture. The strip may have opposed notches 148 to facilitate removal thereof. The picture is disposed outwardly of the lamps 126.

At night or at other periods of darkness, the picture 144 can be readily illuminated by inserting the plug 130 into the socket of an available supply of electric motive force such as the house supply.

It will be noted that the display device 10 has substantial depth as can better be seen by referring to FIG. 2 which shows the device in cross section. The picture frame or holder structure 12 being angularly inclined creates a further impression of depth.

While cardboard has been illustrated and described as the material of the display 10, it will be understood that a suitable and desirable material for such device is two plies of moisture-resistant smooth-surfaced cardboard having corrugated paper therebetween. The moisture resistance quality may be provided by covering or treating the smooth-surfaced cardboard with an adhesive plastic-like or wax-like compound. For example, a spray-on wax or the like may be used. Advantageously, the use of such plastics, waxes or lacquers prevent or inhibit warping of the flanged closure plate 14. For a sturdier construction, a metallic substance such as aluminum, or suitable thickness, may be used.

The invention also contemplates a two or more faced frame or holder construction of various shapes for holding pictures at the front and rear thereof as shown in FIG. 11 and indicated at 10ᵃ. The frame or holder 10ᵃ is similar to the frame or holder 10 except that in place of the backing plate 14, a rectangular-shaped flat strip 146ᵃ similar to strip 146 is pressed against the flanges and serves as a backing plate for a photograph or picture. The picture is disposed outwardly of the lamps 126. The side walls 106ᵃ are wider than the side walls 106, and taper inwardly at the rear.

Referring now to the modified embodiment of the invention shown in FIGS. 12 to 16, inclusive, in this form of picture frame or holder construction 10″, the outer framework structure 12″ is substantially similar to the structure 12 of FIG. 1. However, an opening 150 is formed in the end wall 108″ thereof.

The inner flanged backing plate 14″ is hinged to one long rear edge of the outer framework structure 12″ by means of a tape 152 pasted along the adjacent long edges of the plate and framework structure. Plate 14″ is also provided with circular air vent holes 154 and 155 midway the height thereof at its sides, and with air vent slots 156 at the top and bottom thereof.

A light diffusing sheet 158 of cardboard is positioned on the inner surface of the backing plate at the bottom thereof. Sheet 158 is bent at its longitudinal center as indicated at 160 forming an upper section 162 and a lower section 164. The plate is secured along its long edges to the back plate by adhesive or the like. The top section 162 is inclined downwardly and outwardly and the lower section 164 is curved upwardly. The inner surface of the backing plate 14″ as well as its flanges 112″ is coated with tin foil as indicated at 166 and the outer surface of the sheet 158 of cardboard is similarly coated with tin foil as indicated at 168.

When the flanged backing plate 14″ is in closed condition as shown in FIGS. 12, 15 and 16, the inner edges of the flanges 112″ engage the backing plate 146″ thereby pressing the edges of the photograph or picture 144″ against the inner periphery of the outer framework structure 12″.

In use, the picture frame or holder construction 10″ is placed near a source of light, such as a window, or an electric bulb, whereby the light will penetrate through the opening 150 in the end wall 108″ of the outer framework structure 12″ and the construction will in effect "steal" light and the photograph or picture 144″ will be seen as a translucency.

The vent holes 154 and 155 and slots 156 together with the top opening 150 will ventilate the interior of the picture frame construction so that the picture or photograph 144″ will not become dehydrated. The hole 154 on the side opposite the hinge serves as a handle for manipulating the flanged backing plate 14″.

The invention also contemplates mounting the frame or holder construction on a post suported on a base, and the frame or holder rotatably supported on the post.

The invention also contemplates embodying a sound device in the frame or holder for entertainment purposes.

It will be understood that the configuration of the picture frame construction might be square or any other desirable geometrical shape instead of being rectangular as shown.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

A picture frame construction formed from a rectangular blank of a cardboard having notched corners and fold lines extending parallel to the sides thereof and to the ends thereof, in order to provide a rectangular closure plate with side and end flanges, a rectangular-shaped strip supported on the flanges providing a backing for a picture, an elongated rectangular-shaped strip of cardboard having longitudinally disposed fold lines extending parallel to the sides thereof and extending transversely of the strip to form hollow tubular portions, said strip havings tabs along one long edge thereof, said strip having spaced slots adjacent the other long edge thereof opposed to said tabs, for interlocking the edges of said tubular portions, said tubular portions bendable along said transverse lines forming side and end walls constituted by said tubular portions overlying said closure plate and side and end flanges and rectangular picture supporting strip, a flap on the end of one of the tubular end walls for interlocking said end wall to the adjacent side walls, said rectangular picture backing strip having opposed notches to facilitate removal thereof, said elongated strip having openings at the ends of the transverse fold lines to facilitate bending of the tubular portions, said side and end walls having inwardly slanting portions imparting an impression of depth to the picture frame construction, and electrical lighting equipment supported on the side flanges outwardly of the central backing plate, said equipment including electrical sockets on the side flanges, lamps removably mounted in said sockets, a conductor connecting said sockets, and a cable and plug unit electrically connected to one of said sockets, said closure plate having spaced vent holes and upper and lower vent slots for ventilating the interior of the construction.

References Cited by the Examiner

UNITED STATES PATENTS

| 1,677,840 | 7/28 | Moses | 40—152.2 |
|---|---|---|---|
| 2,522,812 | 9/50 | Bonnet | 88—1 |
| 2,748,017 | 5/56 | Hunt | 117—8 |
| 2,800,735 | 7/57 | Sanders | 40—154 |
| 2,806,310 | 9/57 | Boyd | 40—154 |
| 2,902,787 | 9/59 | Cook | 40—152.2 |

JEROME SCHNALL, *Primary Examiner.*